United States Patent [19]
Anderson

[11] Patent Number: 5,861,870
[45] Date of Patent: Jan. 19, 1999

[54] PNEUMATIC CLICKER FOR COMPUTER INPUT DEVICE

[76] Inventor: Thor M. Anderson, 16245 - 18th Ave. North, Plymouth, Minn. 55447

[21] Appl. No.: 859,883

[22] Filed: May 21, 1997

[51] Int. Cl.⁶ ..................................................... G09G 5/00
[52] U.S. Cl. ........................................... 345/156; 345/157
[58] Field of Search .................................... 345/156, 157, 345/163

[56] References Cited

U.S. PATENT DOCUMENTS

| | | | |
|---|---|---|---|
| 5,184,319 | 2/1993 | Kramer | 345/156 |
| 5,509,423 | 4/1996 | Bryars | 128/690 |

OTHER PUBLICATIONS

Hunter Digital Advertisement, *Introducing the NoHands Mouse: A Revolutionary Foot–Operated Computer Mouse System*, Dec. 13, 1995 (1 page).

*Primary Examiner*—Matthew Luu
*Attorney, Agent, or Firm*—Merchant, Gould, Smith, Edell, Welter & Schmidt, P.A.

[57] ABSTRACT

An accessory for a computer includes two pneumatically activated flexible bulbs, hermetically connected by flexible tubing. One of the bulbs is attached to a switch on an input device for the computer, while the other bulb is remote from the input device. Compression of the remote bulb results in a flow of air to the other bulb, thus activating the switch. The resultant remote activation of the switch permits the user to operate the input device while avoiding repetitive movements causing injury to the user's hand.

20 Claims, 3 Drawing Sheets

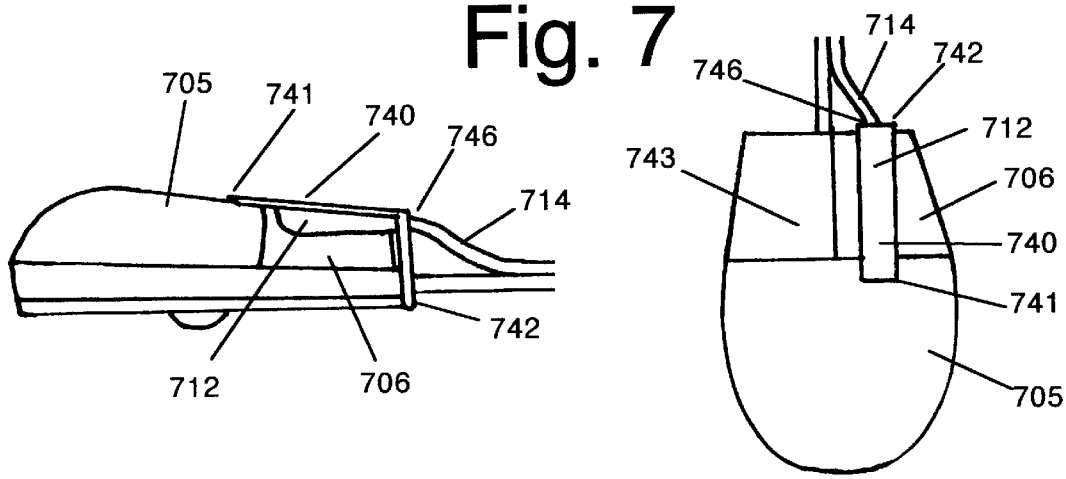
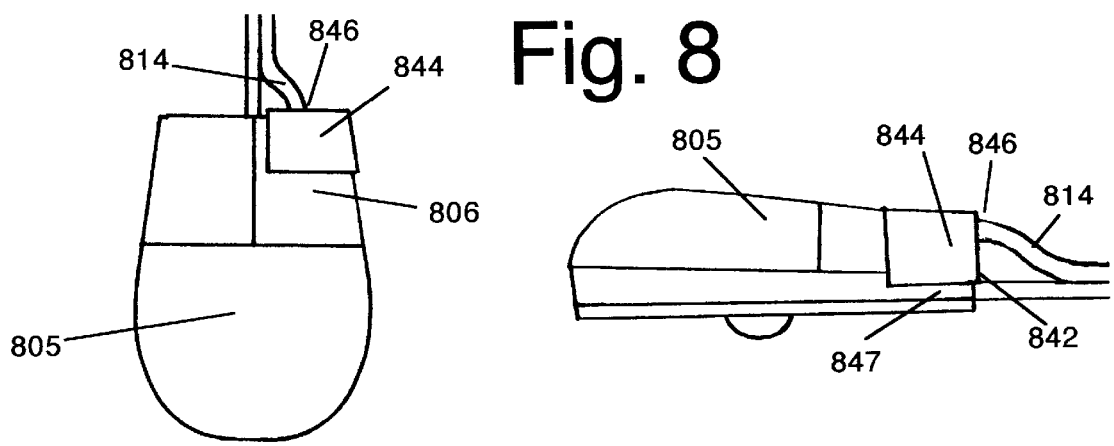
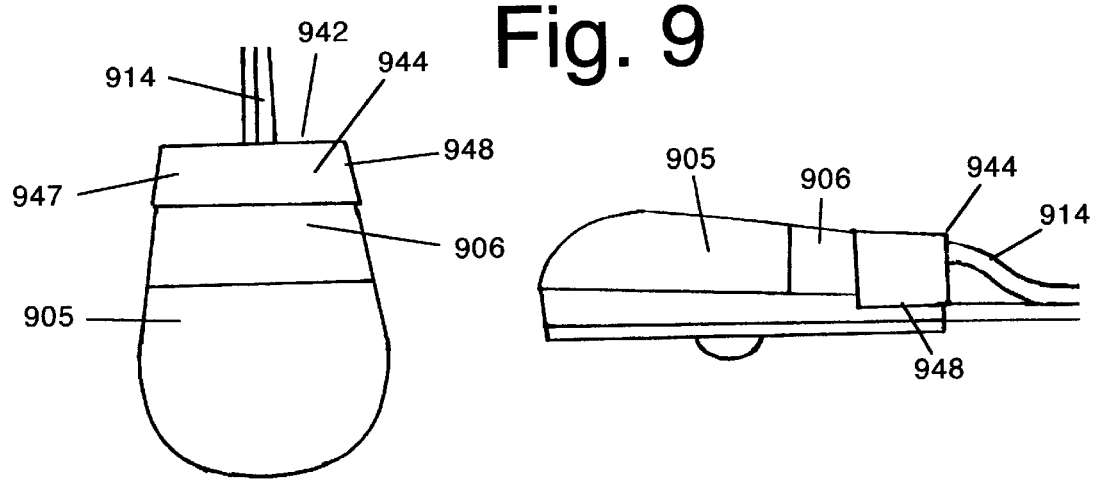

PNEUMATIC CLICKER FOR COMPUTER INPUT DEVICE

BACKGROUND

The present invention is directed generally to a computer-user interface, and particularly to a pneumatic clicker for a computer.

A conventional computer input device, such as a mouse, requires the user to employ a single hand in order to simultaneously perform the following two tasks: a) moving a cursor on a computer screen by manipulating the rotation position of a sphere mounted within the input device relative to the position of the main body of the input device; and b) entering the current location of the screen cursor into the computer by activating a clicking key on the input device using a selected finger of the user's hand, thereby activating various operations such as screen commands, scroll functions and layout changes.

The first of the two tasks, namely manipulating the rotational position of the said sphere relative to the said device, does not involve a particular threat to the operator's health, as the physical movements required of the operator are slight, intermittent and randomly directed. However, the second of the two tasks, namely activating the clicking key, is a frequent and highly repetitive physical task. As the tendons and muscles of the hand, wrist and forearm are relatively small, they are particularly vulnerable to injuries associated with the such a repetitive motion.

Increasingly, as more tasks are being performed on computers, and computer operating systems tend towards the use of a graphical user interface, many people activate the clicking key of an input device, hundreds, even thousands, of times per day. This situation has led to a dramatic increase in injuries related to the repetitive motion required of the small muscles and tendons of the fingers, wrists and forearms.

The following discussion of related problems refer to FIG. 1. When overused, the tendons 26 connected to the finger 27 responsible for activating the "clicking" key 6 of the mouse 5, become swollen, causing discomfort and numbness in the finger 27. This inflammation of the tendons, commonly known as "tendinitis," is a debilitating condition which can only be corrected by prolonged abstinence from any activity involving the injured tendon. This may mean avoiding meaningful use of the finger 27 for weeks or even months to recover.

The tendons 26 of the finger 27 pass through a fibrous sheath 28 in the wrist 33 called the "carpal tunnel." If scar tissue develops within the sheath 28, as a product of repeated overuse of the tendons 26 in the finger 27, pressure is placed on all of the nerves passing through the tunnel 28. This phenomenon, called "carpal tunnel syndrome," is a seriously debilitating condition whose symptoms include varying degrees of numbness, swelling and pain in the affected hand 30 and fingers. Often this condition requires surgery to relieve the pressure on the nerves. After surgery, the wrist 33 is typically cast for a period of time, followed by a period of rehabilitation.

A muscle group 29, located in the forearm 31, is responsible for activating the tendons 26 which, in turn, activate the "clicking" finger 27. If this muscle group 29 becomes fatigued through repeated "clicking," it may become inflamed, causing pain in the surrounding area. Like tendinitis, treatment of this muscle inflammation requires abstinence from the offending activity, followed by a period of rehabilitation.

Referring now to FIG. 2, conventional use of a mouse 205 requires that the computer user's hand 230 stay in close physical contact with the device, since the user's index finger 227 must frequently activate the "clicking key" 206 in order to perform the aforementioned tasks. The result is that the user's hand 230 tends to grip or press against the mouse 205 for prolonged periods. With the hand 230 arched in this way, the wrist 233 tends to drop, creating an unnatural curvature 209 between the hand 230 and forearm 231. The forearm 231 tightens in response to hand tension. Eventually, the tension can travel to the shoulder 210 and neck 211 muscles. Stiffness, fatigue, and irritability are the frequent results.

Many people use computer input devices as a routine part of their work day. Therefore, following an injury, they risk losing their livelihoods if they do not return to their computer related activities in a timely fashion. Unfortunately, a premature return to the offending activity often leads to a relapse of the injury.

It should be noted that all ailments of the finger, wrist or forearm present particular hardships for those who suffer from them, not only because of time missed from work, but also in their everyday lives, as most activities require the use of the hands. Moreover, return to the offending activity often leads to a relapse of the condition.

Problems inherent with the conventional use of computer input devices include risk of tendinitis, carpal tunnel syndrome and muscle inflammation. Less severe symptoms include stress and fatigue. The risk of developing these conditions increases proportionately with the amount of activity required of the user. The toll on those who suffer from these problems include loss of productivity, psychological stress, chronic pain and costly rehabilitation. An employer loses productivity and employees lose morale. Finally, the costs associated with diagnosis, treatment and rehabilitation are considerable, not only to the employer and employee but also on the medical system as a whole.

Therefore, there is a need for affordable computer accessories available that will allow an individual afflicted by the injuries described above to return to their computer related activities in a fashion that will not reinjure or further aggravate their injuries. Furthermore, there is a need for inexpensive, easily adaptable computer accessories available that will augment a computer input device so that the small muscles and tendons of the hand and wrist are exempt from the high risk activity associated with activating the clicking key, thus preventing injury from occurring in the first place.

SUMMARY OF THE INVENTION

The present invention addresses the problems listed above by presenting an inexpensive, highly adaptable apparatus that relieves the hand of the necessity to activate the clicking key of the user's chosen input device. The repetitive motion, and its associated ailments described above, are, therefore, reduced while allowing the user continued use of the input device to which he or she is accustomed. Those persons already afflicted by the above ailments may use the invention in order to help facilitate the return to their normal computer related activities. Arms which are therapeutically splinted or cast can use the invention effectively.

An embodiment of the invention is directed to a device for pneumatically operating the switch of a computer input device. The device includes a first pneumatic bulb connected to a second pneumatic bulb held against the switch of the input device. Compression of the first bulb results in activation of the switch by the second bulb.

An advantage of the invention is that the use of a computer may become easier to people who, because of certain physical challenges, are currently unable to operate conventional computer input devices. For example, an individual may have enough hand/arm dexterity to position a mouse accurately, but not have enough dexterity to activate the clicking key at the same time. The invention allows such an individual to activate the clicking key using his or her foot. Moreover, in a case where neither feet are available to activate the remote bulb, the invention may be positioned so that a free hand, elbow or other body part can activate the device.

The invention does not inhibit conventional access to the clicking key, allowing for conventional operation of the input device, as desired. Use of the invention is not limited to specific computer brands or operating systems.

In another embodiment, the invention may be installed and removed without harm to the input device or invention.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 7 illustrates an embodiment of a plastic bracket attached to a computer mouse;

FIG. 8 illustrates another embodiment of a plastic bracket attached to a computer mouse; and FIG. 9 illustrates another embodiment of a plastic bracket attached to a computer mouse.

Figure 1:
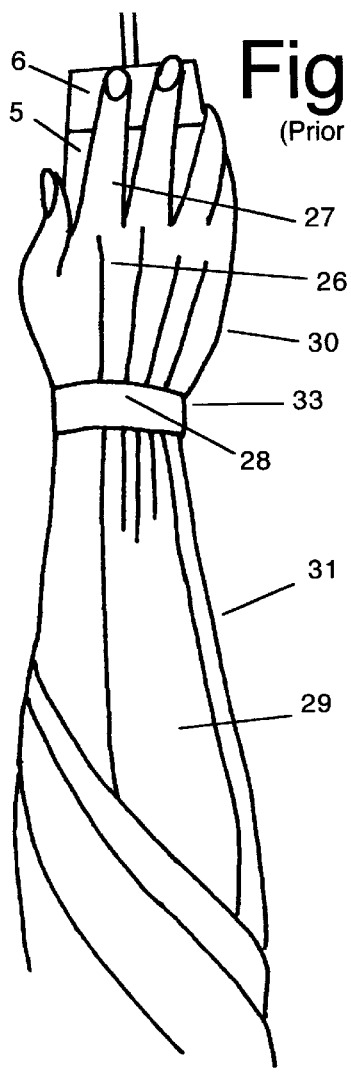
FIG. 1 is an overhead schematic view of selected musculature and tendon structure of a hand situated on a standard computer mouse.
Figure 2:
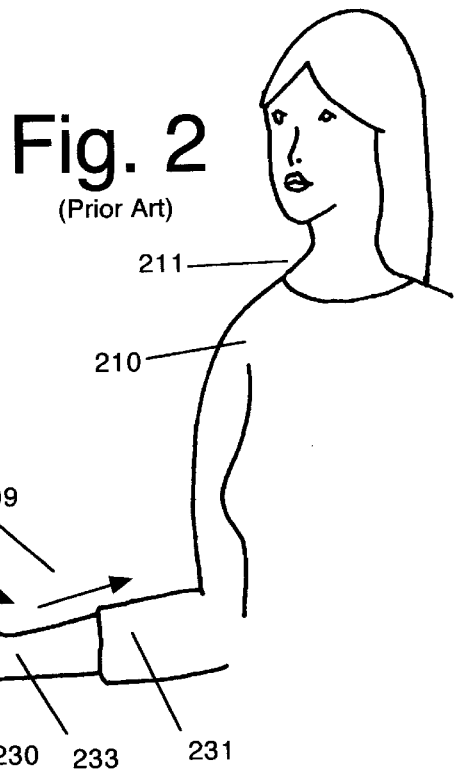
FIG. 2 illustrates a computer user seated and operating a conventional mouse.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The invention described herein addresses several serious health problems associated with the use of conventional computer input devices, and particularly addresses problems associated with movements repeated during the use of such input devices. Particularly, the invention is related to a device that can be provided with a computer input device, or may be retro-fitted on an input device, for reducing injuries related to repetitive movements.

Figure 4:
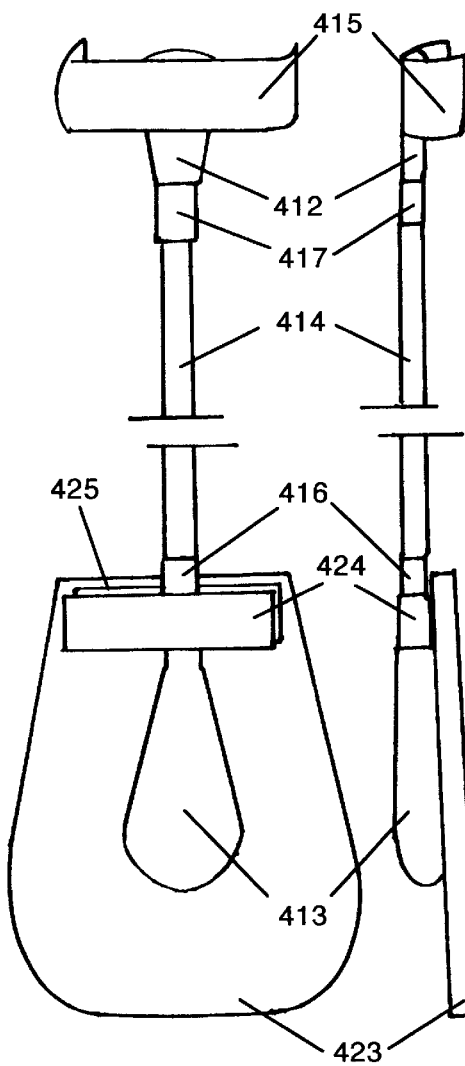
FIG. 4 illustrates overhead and side views of an embodiment of the invention.
Figure 5:
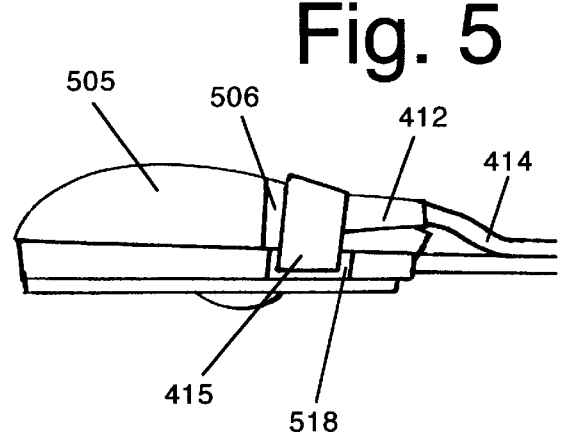
FIG. 5 is a side view of a mouse fitted with an embodiment of the invention.

Referring now to FIGS. 4 and 5, the invention includes two rubber bulbs 412 and 413 connected by flexible tubing 414. The rubber may be a latex rubber. The bulbs 412 and 413 may be shaped differently from the bulbs illustrated. The larger bulb 413, henceforth referred to as the remote bulb, forms a hermetic seal with the flexible tubing 414, for example by fitting over a sleeve 416 that is inserted into one end of the flexible tubing 414. The smaller bulb 412, referred to as the secondary bulb, forms a hermetic seal at the other end of the tube 414. For example, the secondary bulb 412 may fit over a second plastic sleeve 417 inserted into the other end of the flexible tubing 414. The sleeves 416 and 417 may allow the bulbs 412 and 413 to easily detach from the flexible tubing 414. Alternatively, the bulbs 412 and 413 and the flexible tubing 414 may be sealed together using heat-shrink tubing.

The small bulb 412 is held against the clicking key 506, or switch, of the input device 505, so that when the remote bulb 413 is compressed, the small bulb 412 expands and activates the key 506. The small bulb may be held in place, for example, by a bracket 415 affixed to the input device. In FIG. 5, the bracket 415 is shown attached to the input device 505 using detachable strips 518 (e.g. VELCRO). The bracket 415 may be attached using other methods, such as gluing, or plastic welding. Moreover, the bracket 415 may be made of soft, detachable material, such as a detachable strip of VELCRO, for holding the small bulb 412 in place against the key 506.

Figure 6:
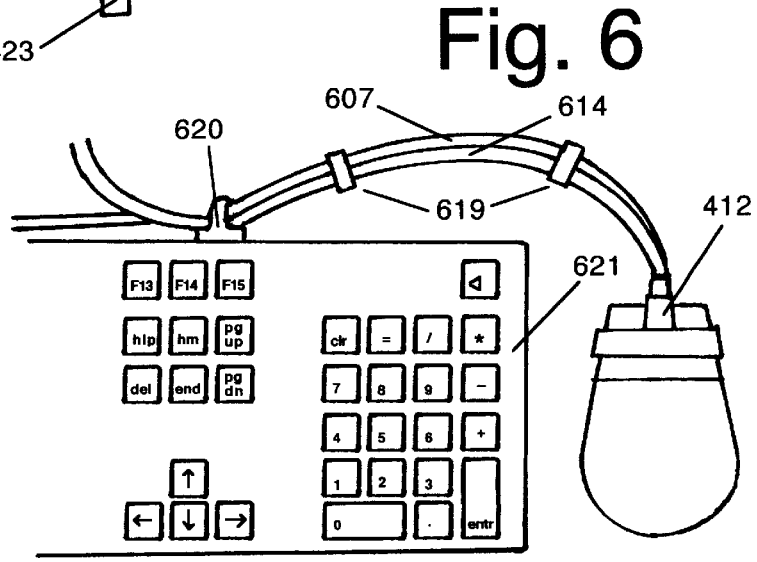
FIG. 6 is an overhead view of a mouse and a computer keyboard fitted with an embodiment of the invention.

Referring now to FIG. 6, the flexible plastic tubing 614 connecting to the small bulb 412 may be held rigidly against the input device cable 607 using tie-wraps 619. The tubing 614 and cable 607 may also be anchored to the computer keyboard 621 with a self-sticking, removable anchor base 620.

Figure 3:
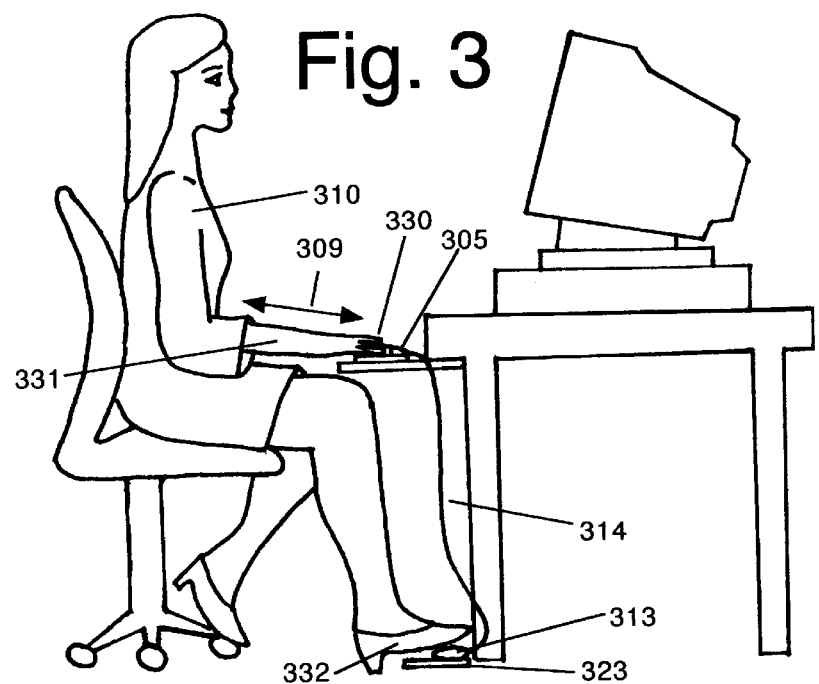
FIG. 3 illustrates a computer workstation with a user seated and operating a mouse fitted with an embodiment of the present invention.

Referring now to FIG. 3, a hand 330 adjusts the input device 305 to manipulate the screen cursor. However, the hand 330 "floats" freely over the input device 305, with the consequence that the hand 330 and forearm 331 can form a straight line 309 and, therefore, are relaxed. In this position, only the large shoulder muscle 310 is activated. The large shoulder muscle 310 can readily absorb the slight movements required to move the screen cursor, without risk of overuse. The hand 330 maintains contact with the input device 305 only when the screen cursor needs to be moved. For example, if the user is required to perform a lengthy scrolling task, the hand 330 can leave the input device 305 as soon as the cursor is positioned on the scroll bar arrow. As the hand 330 is free to move about and is not required to remain on the input device 305, it remains considerably more relaxed, dramatically reducing muscle tension through the entire arm system. The foot 332 initiates scrolling activity by compressing the remote bulb 313, which transfers air through the flexible tubing 314 to expand the small bulb and thus activate the key on the input device 305.

The remote bulb 313 may be attached to a pad 323. The pad 323 provides a firm surface against which the remote bulb 313 can be reliably activated. The pad 323 is designed to be placed on the floor so as to be comfortably activated by the user's foot 332. The size and shape of the pad 323 may be adjusted by trimming according to the user's preference. The pad 323 advantageously provides a non-slip, durable platform for the remote bulb 313 which is easily located by the user's foot 332, and a comfortable surface for the user's foot 332. If the pad 323 is sufficiently large, then the remote bulb 313 cannot be ingested by infants or pets.

The pad 323 may be interchanged with other pads, according to the user's preference. The pad 323 may be formed from a semi-rigid, or rigid material. The invention may be used with or without shoes, although a user may find maximum comfort and sensitivity is achieved without shoes. The length of the flexible tubing 314 may be shortened by the user as desired to accommodate individual workstation configurations.

The pad 323 may be attached to the remote bulb 313 in several ways, including gluing to the remote bulb 313, and affixing using detachable strips, commonly known as VEL-CRO. FIG. 4 illustrates the use of detachable strips. The remote bulb 413 is attached to the pad 423 by attaching a first strip 424 to a second, mating strip 425 which is mounted on the pad 423.

Activating the input device using the invention requires foot to eye coordination comparable to the skill required to operate a sewing machine pedal or accelerator pedal of an automobile. An average user becomes accustomed to using the invention within a few hours of use. Standard computer operations associated with a conventional "clicking" key may be performed with the invention. Such operations include single-clicking, double-clicking, clicking-and-dragging, scrolling, etc.

An alternative embodiment of a bracket for holding the small bulb is illustrated in FIG. 7. In this embodiment, the bracket 740 is attached to the input device 705 at two points 741 and 742. Attachment can be made using a number of methods, as described above. The small bulb 712 is attached to the underside of the bracket 740 and fits snugly into the space between the bracket 740 and the input device key 706. There may be a hole 746 provided in the bracket 740 to permit passage of the flexible tubing 714 therethrough. This embodiment of the bracket is suitable for use with a single-keyed input device or multiple-keyed input device, leaving additional keys 743 free for manual activation. Additional brackets and bulbs may be installed to any of the additional keys.

In another embodiment, the bracket 740 is attached to the input device 705 at one location, for example position 742. This permits the use of a shorter bracket, thus providing the key with a greater exposed area for manual operation.

Another embodiment of the bracket is illustrated in FIG. 8. In this embodiment, the bracket 844 covers a portion of the key 806 of the input device 805. The bracket is affixed to the side 847 and the back 842 of the input device 805. The flexible tubing 814 enters and is attached to the bracket 844 by a hole 846 in the back of the bracket 844. Additional keys may be provided with additional brackets and pneumatic bulbs.

Another embodiment of the bracket is illustrated in FIG. 9. In this embodiment, the bracket 944 is adapted for an input device 905 having a single key 906. The bracket 944 is affixed to the sides 947 and 948 and the back 942 of the input device 905. The flexible tubing 914 enters the bracket by a hole 946 in the back of the bracket.

While various examples were provided above, the present invention is not limited to the specifics of the examples. For example, the invention may be configured to work with an input device that contains more than one key. The user's foot may activate a selected key, perhaps the clicking key used most often, while the user's hand operates a second and/or a third key.

Furthermore, the invention may be configured with two or more remote bulbs, tubes and activating bulbs so that, on an input device with two or more clicking keys, the user is able to selectively activate two or more clicking keys by activating the corresponding remote bulbs by foot, feet or other body parts.

A "mouse" type input device has been featured in this discussion for illustrative purposes, as it is currently the most prevalent and popular type of input device. It will be appreciated that the invention is applicable to other types of input device, which require repetitive movements of the fingers and hand, such as trackball- and joystick-type input devices. For example, a trackball device may be provided with a small bulb on an input key, where the small bulb is mounted using an appropriate bracket or some other mounting device.

As noted above, the present invention is applicable for use with computer input devices requiring repetitive finger and hand movements. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

I claim:

1. A computer accessory for mechanically operating a switch on a computer input device, the computer accessory including:

a first pneumatic bulb;

a pneumatic information channel connected at a first end to the first pneumatic bulb; and a second pneumatic bulb connected at a second end of the pneumatic channel to receive air from the first pneumatic bulb, the second pneumatic bulb being mountable on the input device so as to activate the switch in response to compression of the first pneumatic bulb.

2. A computer accessory as recited in claim 1, wherein the pneumatic channel is formed of flexible tubing.

3. A computer accessory as in recited in 1, wherein the first and second pneumatic bulbs are formed of rubber.

4. A computer accessory as recited in claim 1, wherein the first pneumatic bulb is mounted upon a pad.

5. A computer accessory as recited in claim 1, wherein the pneumatic channel is detachably connected to the first and second pneumatic bulbs.

6. A computer accessory as recited in claim 1, further comprising a bracket attachable to the input device, the second pneumatic bulb being mounted on the bracket so as to be rigidly holdable against the switch of the input device by a bracket.

7. A computer accessory as recited in claim 6, wherein the bracket is detachably attached to the input device.

8. A computer accessory as recited in claim 1, further comprising a detachable strap attachable to the input device so as to hold the second pneumatic bulb rigidly against the switch of the input device.

9. A computer accessory as recited in claim 2, wherein the computer input device has a flexible information channel and at least a portion of the flexible tubing is held against at least a portion of the flexible information channel of said input device.

10. An apparatus for use with a computer, comprising:

an input device having a a mechanically activatable switch for inputting information to the computer;

a first pneumatic bulb;

a pneumatic information channel connected at a first end to the first pneumatic bulb; and a second pneumatic bulb connected at a second end of the pneumatic channel to receive air from the first pneumatic bulb, the second pneumatic bulb detachably mounted on the input device so as to activate the mechanically activatable switch in response to compression of the first pneumatic bulb.

11. An apparatus as recited in claim 10, wherein the pneumatic channel is formed of flexible tubing.

12. An apparatus as recited in claim 10, wherein the first pneumatic bulb and the second pneumatic bulb are formed of rubber.

13. An apparatus as recited in claim 10, further comprising a pad, the first pneumatic bulb being mounted on the pad.

14. An apparatus as recited in claim 10, wherein the pneumatic channel is detachably connected to the remote pneumatic bulb and the secondary pneumatic bulb.

15. An apparatus as recited in claim 10, wherein the second pneumatic bulb is rigidly held against the first switch by a bracket mounted on the input device.

16. An apparatus as recited in claim 15, wherein the input device is provided with a second switch.

17. An apparatus as recited in claim 11, further comprising ties to tie at least a portion of the flexible tubing against an information channel of the input device.

18. An apparatus as recited in claim 17, wherein another portion of the tubing is supported on a keyboard of the computer.

19. A device for a user to mechanically operate a switch on a computer input device, the device including:

a first pneumatic bulb, compressible by the user;

a pneumatic channel connected at a first end to the first pneumatic bulb; and a second pneumatic bulb connected at a second end of the pneumatic channel in pneumatic communication with the first pneumatic bulb, the second pneumatic bulb being attachable to the input device and being expandable in response to compression of the first pneumatic bulb;

whereby expansion of the second pneumatic bulb results in mechanical operation of the switch when the device is attached to the computer input device.

20. An apparatus as disclosed in claim 10, wherein the computer input device is one of a mouse, a joystick and a trackball-device.

* * * * *